US009405789B2

(12) United States Patent
Skatell et al.

(10) Patent No.: US 9,405,789 B2
(45) Date of Patent: *Aug. 2, 2016

(54) SORTING INFORMATION BY RELEVANCE TO INDIVIDUALS WITH PASSIVE DATA COLLECTION AND REAL-TIME INJECTION

(71) Applicant: Media Group of America Holdings, LLC, Wilmington, DE (US)

(72) Inventors: Alexander Hoke Skatell, Washington, DC (US); Carl Joseph Sceusa, Washington, DC (US); Adam Wojtonis, Arlington, VA (US); Anton Vuljaj, Washington, DC (US)

(73) Assignee: Media Group of American Holdings, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,744

(22) Filed: Oct. 22, 2015

(65) Prior Publication Data

US 2016/0048521 A1   Feb. 18, 2016

Related U.S. Application Data

(63) Continuation of application No. 14/850,783, filed on Sep. 10, 2015, which is a continuation of application No. 14/510,010, filed on Oct. 8, 2014, now Pat. No. 9,171,084.

(60) Provisional application No. 62/059,799, filed on Oct. 3, 2014, provisional application No. 62/033,006, filed on Aug. 4, 2014.

(51) Int. Cl.
*G06F 17/30* (2006.01)
*G06F 7/24* (2006.01)
(Continued)

(52) U.S. Cl.
CPC ............ *G06F 17/30371* (2013.01); *G06F 7/24* (2013.01); *G06F 17/3053* (2013.01);
(Continued)

(58) Field of Classification Search
None
See application file for complete search history.

(56) References Cited

U.S. PATENT DOCUMENTS 7,337,458 B2   2/2008  Michelitsch et al.
7,406,516 B2   7/2008  Davis et al.
(Continued)

FOREIGN PATENT DOCUMENTS

EP          2994843 A1   3/2016
WO   WO-2013014471 A1   1/2013
(Continued)

OTHER PUBLICATIONS

PCT/US2014/062452 International Search Report and Written Opinion mailed Mar. 31, 2015.
(Continued)

*Primary Examiner* — Belix M Ortiz Ditren
(74) *Attorney, Agent, or Firm* — Wilson Sonsini Goodrich & Rosati

(57) ABSTRACT

In one aspect, data, such as information articles, is sorted and prioritized based on a plurality of factors, such as user interest and popularity of data with respect to other users. The data is sorted by initial personal (i.e., user) data, sorted by the most relevant to the user, while passive interaction data is used to continually reorder the articles in real-time, while new stories are being injected into the stream in real time, all while other articles are increasing/decreasing in stature based on popularity with regard to other users and time decay. As such, the system provides that the information is fed to users in an efficient manner, in a manner based on time relevance, assumed interest with regard to that given user based on past actions by that user or information otherwise known about that user, as well as interest in the articles demonstrated by other users.

20 Claims, 19 Drawing Sheets

(51) Int. Cl.
*H04L 29/08* (2006.01)
*H04L 29/06* (2006.01)
*G06N 7/00* (2006.01)

(52) U.S. Cl.
CPC .... *G06F 17/30424* (2013.01); *G06F 17/30528* (2013.01); *G06F 17/30536* (2013.01); *G06F 17/30554* (2013.01); *G06F 17/30648* (2013.01); *G06F 17/30864* (2013.01); *G06F 17/30867* (2013.01); *G06N 7/005* (2013.01); *H04L 65/4084* (2013.01); *H04L 65/4092* (2013.01); *H04L 67/306* (2013.01)

(56) References Cited

U.S. PATENT DOCUMENTS

| | | | |
|---|---|---|---|
| 7,730,054 B1 * | 6/2010 | Marmaros | G06F 17/30867 707/713 |
| 8,108,245 B1 | 1/2012 | Hosea et al. | |
| 8,171,032 B2 | 5/2012 | Herz | |
| 8,620,767 B2 | 12/2013 | Linden et al. | |
| 8,667,519 B2 * | 3/2014 | Small | H04N 21/4223 725/10 |
| 8,676,798 B1 | 3/2014 | Datta et al. | |
| 9,037,592 B2 * | 5/2015 | Walkingshaw | G06F 17/3053 707/748 |
| 9,171,084 B1 | 10/2015 | Skatell et al. | |
| 9,317,611 B2 | 4/2016 | Datta et al. | |
| 2003/0074447 A1 | 4/2003 | Rafey et al. | |
| 2007/0106674 A1 | 5/2007 | Agrawal et al. | |
| 2009/0005657 A1 | 1/2009 | Bodlaender et al. | |
| 2009/0089380 A1 | 4/2009 | Wang et al. | |
| 2009/0164408 A1 * | 6/2009 | Grigorik | G06F 17/30867 |
| 2009/0248599 A1 | 10/2009 | Hueter et al. | |
| 2010/0169262 A1 | 7/2010 | Kenedy et al. | |
| 2010/0198090 A1 | 8/2010 | Hudson et al. | |
| 2011/0015991 A1 | 1/2011 | Fayyad et al. | |
| 2011/0230790 A1 | 9/2011 | Kozlov | |
| 2012/0046936 A1 | 2/2012 | Kandekar et al. | |
| 2012/0290637 A1 | 11/2012 | Perantatos et al. | |
| 2013/0031034 A1 | 1/2013 | Gubin et al. | |
| 2013/0325878 A1 | 12/2013 | Lichana | |
| 2014/0052527 A1 | 2/2014 | Roundtree | |
| 2015/0335288 A1 | 11/2015 | Toth et al. | |
| 2016/0050247 A1 | 2/2016 | Skatell et al. | |
| 2016/0063125 A1 | 3/2016 | Skatell et al. | |
| 2016/0117356 A1 | 4/2016 | Skatell et al. | |
| 2016/0132607 A1 | 5/2016 | Skatell | |

FOREIGN PATENT DOCUMENTS

| | | |
|---|---|---|
| WO | WO-2013095348 A1 | 6/2013 |
| WO | WO-2016022163 A1 | 2/2016 |

OTHER PUBLICATIONS

U.S. Appl. No. 14/510,010 Office Action mailed Jan. 30, 2015.
Cai et al., Relevance feedback based on particle swarm optimization for image retrieval Proceedings of the 2012 International Conference on Information Technology and Software Engineering, Chapter 79, vol. 212 of the series Lecture Notes in Electrical Engineering, Nov. 8, 2012, p. 749-756.
European Patent Application No. EP14825483.2 first Examination Report dated May 10, 2016.
Kriegel et al., Database support for haptic exploration in very large virtual environments Proceedings of the 11th International Multimedia Modeling Conference (MMM'05), Date of Conference: Jan. 12-14, 2005, p. 352-357.
U.S. Appl. No. 14/920,756 First Action Interview dated Jan. 20, 2016.
U.S. Appl. No. 14/922,020 First Action Interview Program Pre-Interview Communication dated Mar. 16, 2016.

\* cited by examiner

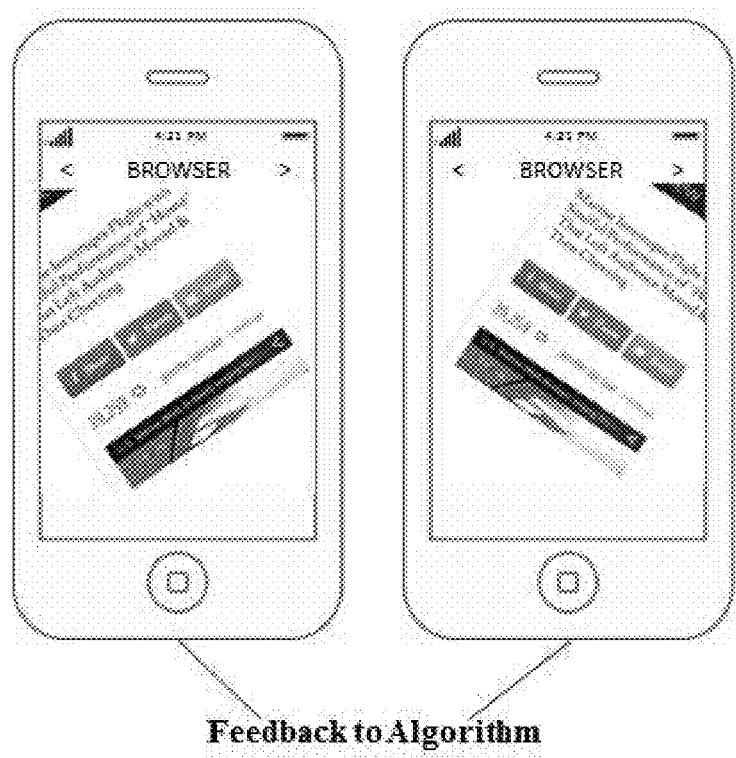
FIG 5B

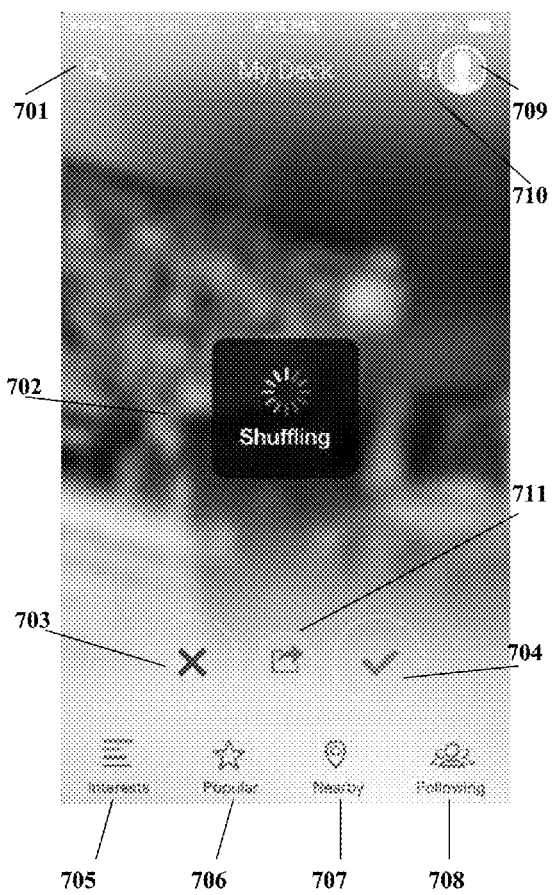
FIG 7A                    FIG 7B 1001            1002

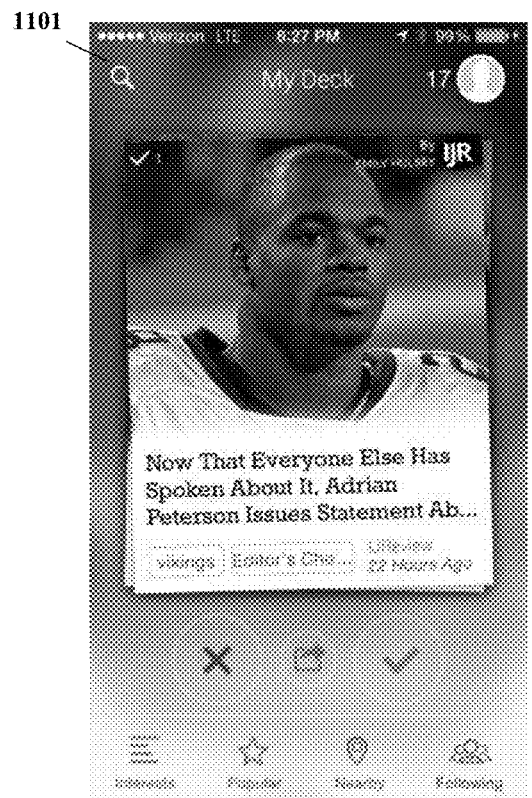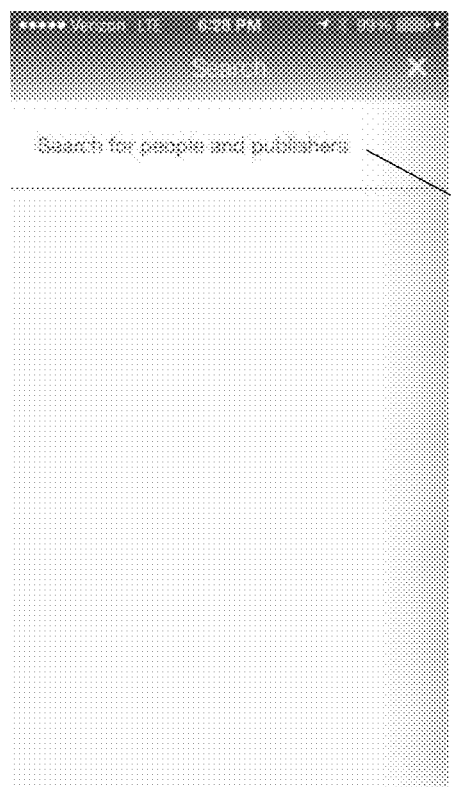
FIG 11A                    FIG 11B

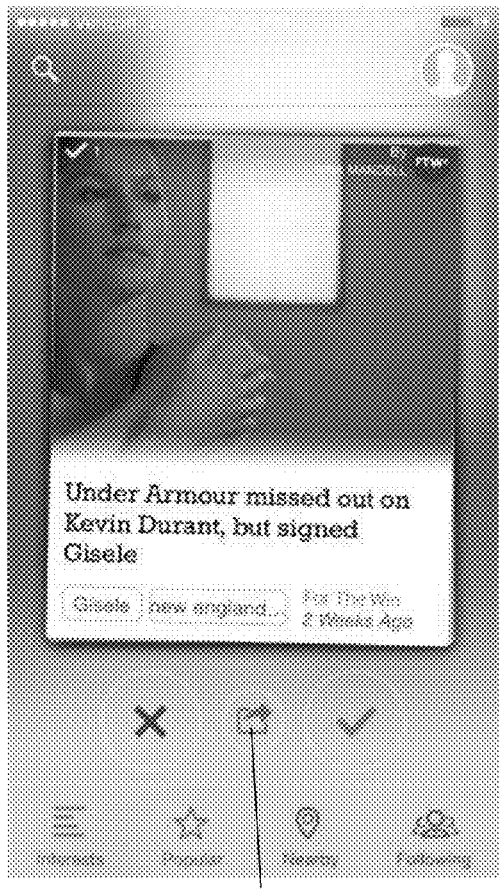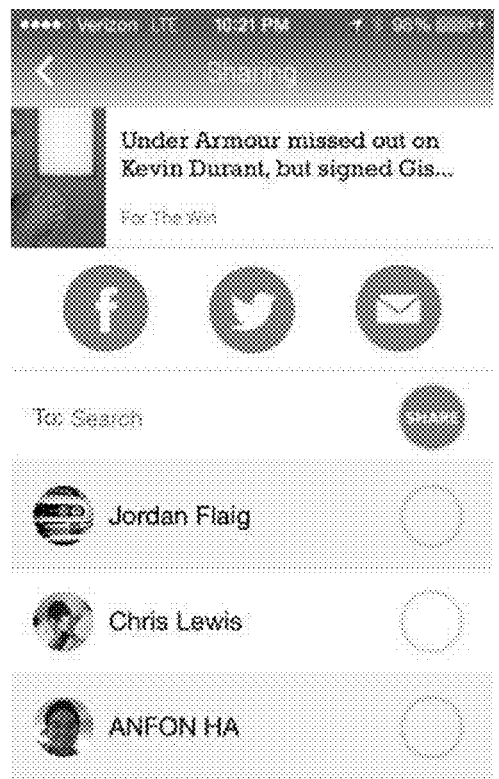
1201
FIG 12A
FIG 12B

Information sources (API, RSS, etc)

The analysis "Machine"

1. Convert to machine readable and verify format.
2. Process text to keywords.
   - Remove variations of words/reduce words to simplest form.
   - Remove stop words.
3. Text classification.
   - Algorithmically searches text to recommend defined categories/ topics.
   - System then chooses top recommendations for categories/topics.
4. Topics/categories are assigned to Article.

Additional article data is then processed and added to the application data model.

FIG 13

SORTING INFORMATION BY RELEVANCE TO INDIVIDUALS WITH PASSIVE DATA COLLECTION AND REAL-TIME INJECTION

CROSS-REFERENCE TO RELATED APPLICATIONS

This application is continuation of U.S. application Ser. No. 14/850,783 filed Sep. 10, 2015, which is a continuation of U.S. application Ser. No. 14/510,010 filed Oct. 8, 2014 which claims the benefit of U.S. Application Ser. Nos. 62/059,799 filed Oct. 3, 2014 and 62/033,006 filed Aug. 4, 2014, which are hereby incorporated by reference in its entirety

BACKGROUND OF THE INVENTION

The present invention generally relates to data and/or information collection, sorting and presentation.

A problem generally encountered by publishers is, while much information (such as information files, including articles, videos, audios, images, and the like) may have been collected or is otherwise in possession of the publisher, the publisher must determine the best and the most suitable information and manner to present such information to a given user. For example, a user who has no interest in politics would not be well-served by a publisher to be bombarded with news stories about politics. In contrast, a user who is a sports fanatic would be well-served by a publisher to be presented with interesting stories about sports. While a publisher can certainly request that a user complete a questionnaire to identify interests in advance of presenting that user with stories and/or other information, or request that a user provide feedback after reading an article, such methods are cumbersome and may not be appreciated by all users.

SUMMARY OF THE INVENTION

An objective of an embodiment of the present subject matter, including the systems, media, devices, methods, and platforms described herein, is to provide an efficient and effective manner of sorting and presenting information to a user. To avoid the time-consuming, inefficient and ineffective traditional information collection and information sorting which relies largely on papers (e.g., newspapers or magazines), the subject matter disclosed herein provides a novel computing application to collect information from all publishers. For example, after collection, the system identifies the best match information with the user. In certain embodiments, the system is based on novel computational algorithms and mobile technologies which transform the traditional information collection and collection into mobile, real-time, on-the-go, and ubiquitous.

Specifically, in one embodiment of the present invention, one or more information processing servers are used to collect data (such as files, including news stories, images, videos, and audios, etc.) from a plurality of sources. These sources may include, but may not be limited to, RSS feeds, application program interfaces (API's) from publishers, and data from social media (such as Twitter, Facebook, and Instagram). The information processing server(s) assigns attributes (such as location, popularity, etc.) to the data, and stores the data and attributes in one or more databases. Also stored in the one or more databases (or one or more other databases) is information about individual users, such as user preferences and other user-related information.

In another embodiment, users are provided access to one or more applications, such as access to an application which may be loaded by the user onto computing device, such as a desktop computer, a mobile or tablet device. A user then uses the application to request information from the system. This request is received by one or more computers running one or more API's, and articles, images, videos, audios, etc. stored in the one or more databases are matched up and delivered to that particular user.

Regarding which information, including articles and the like are delivered to a given user, the data is preferably sorted and prioritized based on a plurality of factors, such as user interest and popularity of data with respect to other users. Preferably, information articles are graphed or sorted by initial personal (i.e., user) data, sorted by the most relevant to the user, while passive interaction data is used to continually reorder the articles in real-time, while new stories are being injected into the stream in real time, all while other articles are increasing/decreasing in stature based on popularity with regard to other users and time decay. In the embodiments where information images, audios and/or videos are being presented, one or more snapshots are graphed or sorted by initial personal (i.e., user) data, sorted by the most relevant to the user; the same passive interaction data is used to continually reorder the articles in real-time, while new images/audios/videos are being injected into the stream in real time, all while other images/audios/videos are increasing or decreasing in stature based on popularity with regard to other users and time decay. As such, the systems, methods, media, devices, and platforms described herein provide that information, such as articles, which are fed to users in an efficient manner, in a manner based on time relevance, assumed interest with regard to that given user based on past actions by that user or information otherwise known about that user, as well as interest in the articles demonstrated by other users.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 5A and FIG. 5B are similar to FIG. 4A and FIG. 4B but illustrate the effect of user interaction with an application with regard to queries.

FIG. 7A and FIG. 7B illustrate an example of the graphic user interface in an embodiment.

FIG. 11A-E illustrate an example embodiment using the search function to find publishers of interest; in this case, the user was looking for New York Times.

FIG. 12A and FIG. 12B illustrate an example of an embodiment using the share function to share the information on social media.

FIG. 13 illustrates an example of statistical data analysis using a classifier.

DETAILED DESCRIPTION OF THE INVENTION

Figure 1:
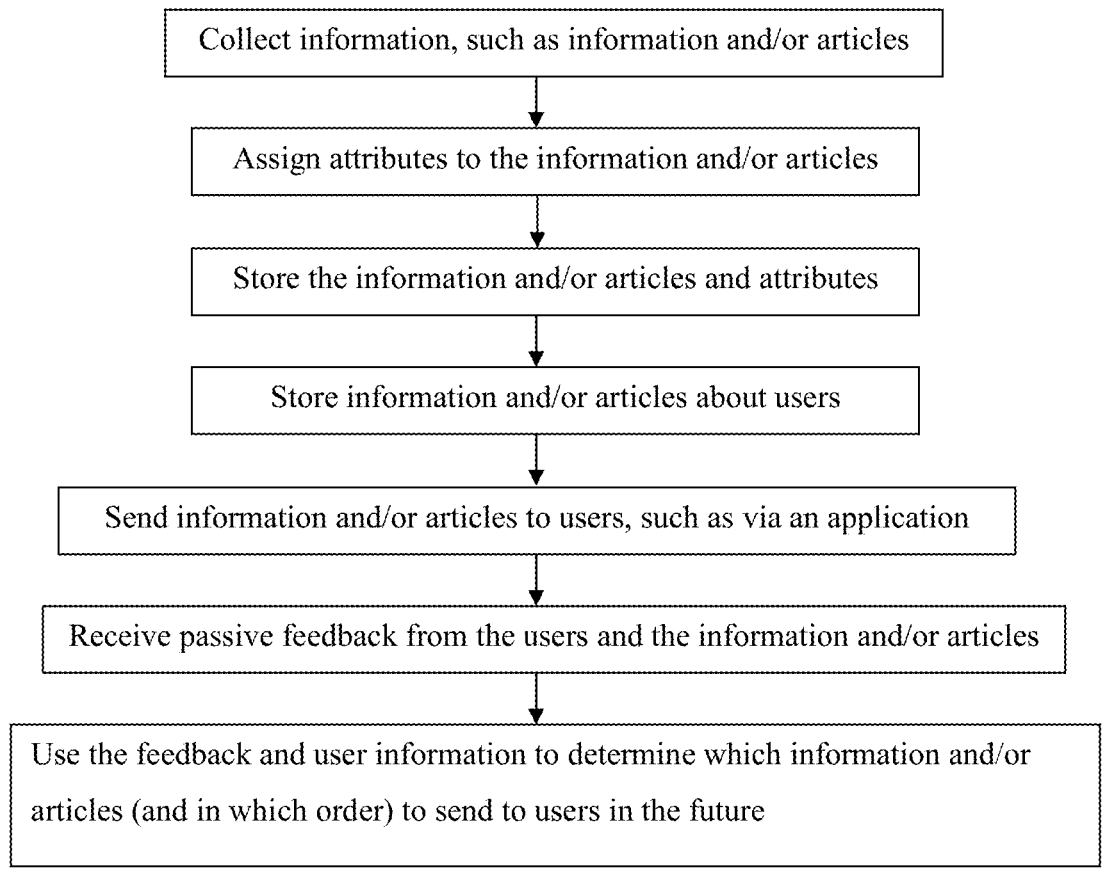
FIG. 1 is a flow chart which illustrates a computerized method of collecting, sorting and presenting information to a user, where the computerized method is in accordance with an embodiment of the present technology.

In one aspect, disclosed herein are non-transitory computer-readable storage media encoded with a computer program including instructions executable by a processor to create an application comprising: (a) a software module configured to receive and/or transmit information from an information source on the Internet; (b) a software module configured to assign one or more attributes to the information; (c) a software module configured to sort the information and identify preferable information; and (d) a software module configured to receive a feedback from the user regarding the preferable information presented to the user. In some embodiments, the information comprises one of the following: an article, a message, a text, a video file, an audio file, a data table, and a database. In certain embodiments, the information source comprises one or more of the following: an RSS feed, a website, a publisher, an author, a social medium, a news provider, a freelancer, a writer, an individual, a corporate entity, and a government agency. In some embodiments, the one or more attributes comprise one or more of: a location, popularity, a target audience, an author, a country, a category of information content. In additional embodiments, the media further comprise a software module configured to receive user data from a user. The user data comprises one or more of: demographic information of the user, an interest of the user, and past preferable information of the user. In some embodiments, sorting the information comprises one or more of: analyzing demographic information of the user, comparing data of the user with data of another user, analyzing the feedback from the user, analyzing a time when the information is generated at the information source, analyzing the information source, analyzing popularity of the information in the general public, and analyzing popularity of the information among the user's friends. In some embodiments, sorting the information takes place periodically on a regular basis, periodically on an irregular basis, or whenever the media receives a feedback. In some embodiments, the feedback comprises a passive feedback. In some embodiments, receiving a feedback comprises identifying an action from the user after the user accesses the preferable information; the action comprises one or more of: clicking a button, wiping the preferable information, flicking the preferable information, sliding the preferable information, and swiping the preferable information. Furthermore, the action comprises a length of time the user accessing the preferable information. In some cases, the action comprises a location where the user accessing the preferable information. In certain embodiments, the action comprises a device on which the user accessing the preferable information. In additional embodiments, the media further comprises a software module configured to present the preferable information to the user. In some embodiments, the media further comprises a database to store the information and the one or more attributes. In some embodiments, the media further comprises a database to store the user data. In an embodiment, the media is a software as a service.

In another aspect, disclosed herein is a computer-implemented system, the system comprising: (a) a digital signal processor; (b) memory and an operating system configured to execute computer instructions to create an application, the application comprising: (1) a software module configured to receive and/or transmit information from an information source on the Internet; (2) a software module configured to assign one or more attributes to the information; (3) a software module configured to sort the information and identify preferable information; and (4) a software module configured to receive a feedback from the user regarding the preferable information presented to the user. In some embodiments, the information comprises one of the following: an article, a message, a text, a video file, an audio file, a data table, and a database. In certain embodiments, the information source comprises one or more of the following: an RSS feed, a website, a publisher, an author, a social medium, a news provider, a freelancer, a writer, an individual, a corporate entity, and a government agency. In some embodiments, the one or more attributes comprise one or more of: a location, popularity, a target audience, an author, a country, a category of information content. In additional embodiments, the application further comprises a software module configured to receive user data from a user. The user data comprises one or more of: demographic information of the user, an interest of the user, and past preferable information of the user. In some embodiments, sorting the information comprises one or more of: analyzing demographic information of the user, comparing data of the user with data of another user, analyzing the feedback from the user, analyzing a time when the information is generated at the information source, analyzing the information source, analyzing popularity of the information in the general public, and analyzing popularity of the information among the user's friends. In some embodiments, sorting the information takes place periodically on a regular basis, periodically on an irregular basis, or whenever the media receives a feedback. In some embodiments, the feedback comprises a passive feedback. In some embodiments, receiving a feedback comprises identifying an action from the user after the user accesses the preferable information; the action comprises one or more of: clicking a button, wiping the preferable information, flicking the preferable information, sliding the preferable information, and swiping the preferable information. Furthermore, the action comprises a length of time the user accessing the preferable information. In some cases, the action comprises a location where the user accessing the preferable information. In certain embodiments, the action comprises a device on which the user accessing the preferable information. In additional embodiments, the application further comprises a software module configured to present the preferable information to the user. In some embodiments, the application further comprises a database to store the information and the one or more attributes. In some embodiments, the application further comprises a database to store the user data.

In another aspect, disclosed herein is a method implemented by one or more computing devices, the method comprising: (a) receiving and/or transmitting, by the one or more computing devices, information from an information source on the Internet; (b) assigning, by the one or more computing devices, one or more attributes to the information; (c) sorting, by the one or more computing devices, the information and identify preferable information; and (d) receiving, by the one or more computing devices, a feedback from the user regarding the preferable information presented to the user. In some embodiments, the information comprises one of the following: an article, a message, a text, a video file, an audio file, a data table, and a database. In certain embodiments, the information source comprises one or more of the following: an RSS feed, a website, a publisher, an author, a social medium, a news provider, a freelancer, a writer, an individual, a corporate entity, and a government agency. In some embodiments, the one or more attributes comprise one or more of: a location, popularity, a target audience, an author, a country, a category of information content. In additional embodiments, the method further comprises receiving user data from a user. The user data comprises one or more of: demographic information of the user, an interest of the user, and past preferable information of the user. In some embodiments, sorting the information comprises one or more of: analyzing demographic information of the user, comparing data of the user with data of another user, analyzing the feedback from the user, analyzing a time when the information is generated at the information source, analyzing the information source, analyzing popularity of the information in the general public, and analyzing popularity of the information among the user's friends. In some embodiments, sorting the information takes place periodically on a regular basis, periodically on an irregular basis, or whenever the media receives a feedback. In some embodiments, the feedback comprises a passive feedback. In some embodiments, receiving a feedback comprises identifying an action from the user after the user accesses the preferable information; the action comprises one or more of: clicking a button, wiping the preferable information, flicking the preferable information, sliding the preferable information, and swiping the preferable information. Furthermore, the action comprises a length of time the user accessing the preferable information. In some cases, the action comprises a location where the user accessing the preferable information. In certain embodiments, the action comprises a device on which the user accessing the preferable information. In additional embodiments, the method further comprises presenting the preferable information to the user. In some embodiments, the method further comprises using a database to store the information and the one or more attributes. In some embodiments, the method further comprises using a database to store the user data.

System Design

Traditionally, information collection and information sorting relied largely on newspapers or magazines. Publishers publish information on paper-based newspapers or magazines, and the subscribers purchased or subscribed the newspapers or magazines of interest. However, when the information becomes too expansive, it is not efficient, practical or even possible to subscribe all the newspapers or magazines of interest to a user, nor is it workable for the user to view each and every single piece of information (articles, videos, audios, and the like). The inventor has identified a new way to collect and sort information of interest to a user, which is the subject matter of this application. The subject matter disclosed herein is based on a computer-implemented system, methods, devices, and platforms. In contrast to the traditional manner, which cannot collect and sort all the information from all publishers or efficiently provide it to the user, the computer-implemented systems, methods, media, devices, and platforms disclosed herein, in certain applications, collects and sorts all relevant information. Furthermore, unlike the traditional methods that take an exorbitant amount of time for information collection and sorting, the systems, methods, media, devices, and platforms described herein, in certain applications, are instantaneous or require only seconds. Moreover, it is impossible for the traditional, paper-based collection and sorting to identify interested information with high accuracy. The subject matter disclosed herein incorporates computing systems, media, methods, devices, and platforms to analyze the information that best matches with readers and viewers of content. In addition, the subject system described in this application utilizes mobile technologies and computing power to make information collection and sorting mobile, real-time, on-the-go, and ubiquitous.

While the technology presented in the subject matter may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 2:
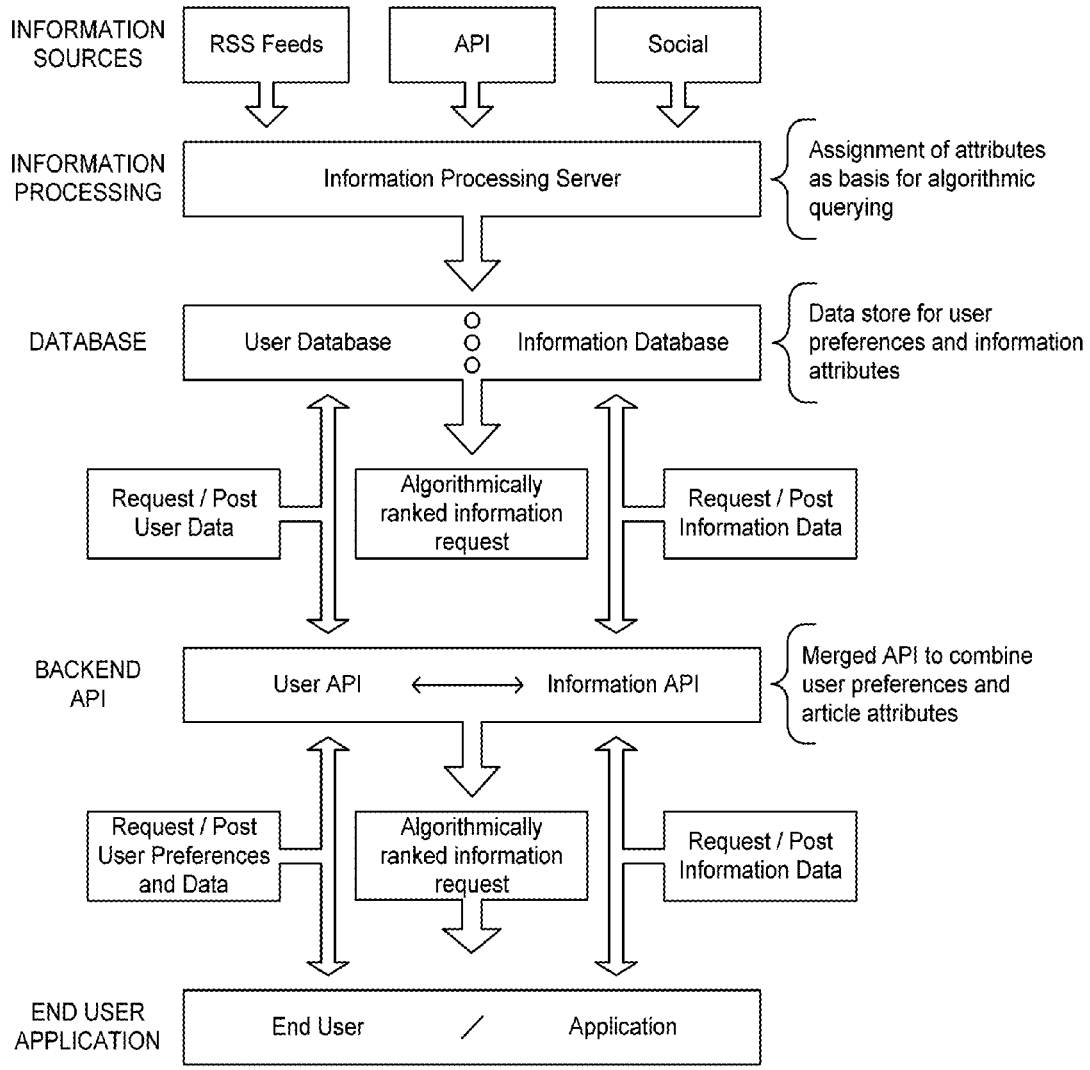
FIG. 2 is a diagram which illustrates a system or architecture which can be used to practice the method shown in FIG. 1.
Figure 4A:
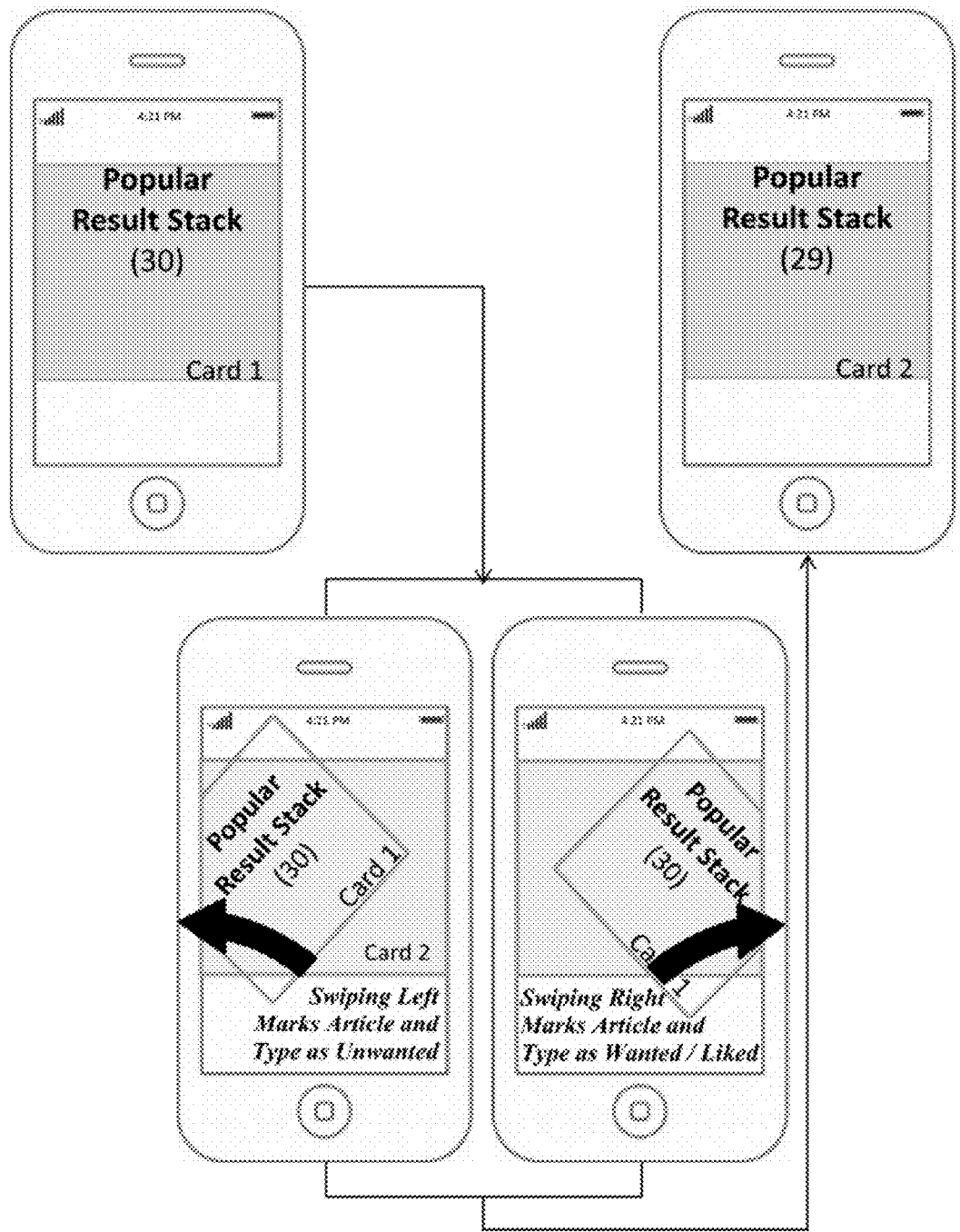
FIG. 4A and FIG. 4B are an illustration which shows the effect of user interaction with an application with regard to the method and system.
Figure 4B:
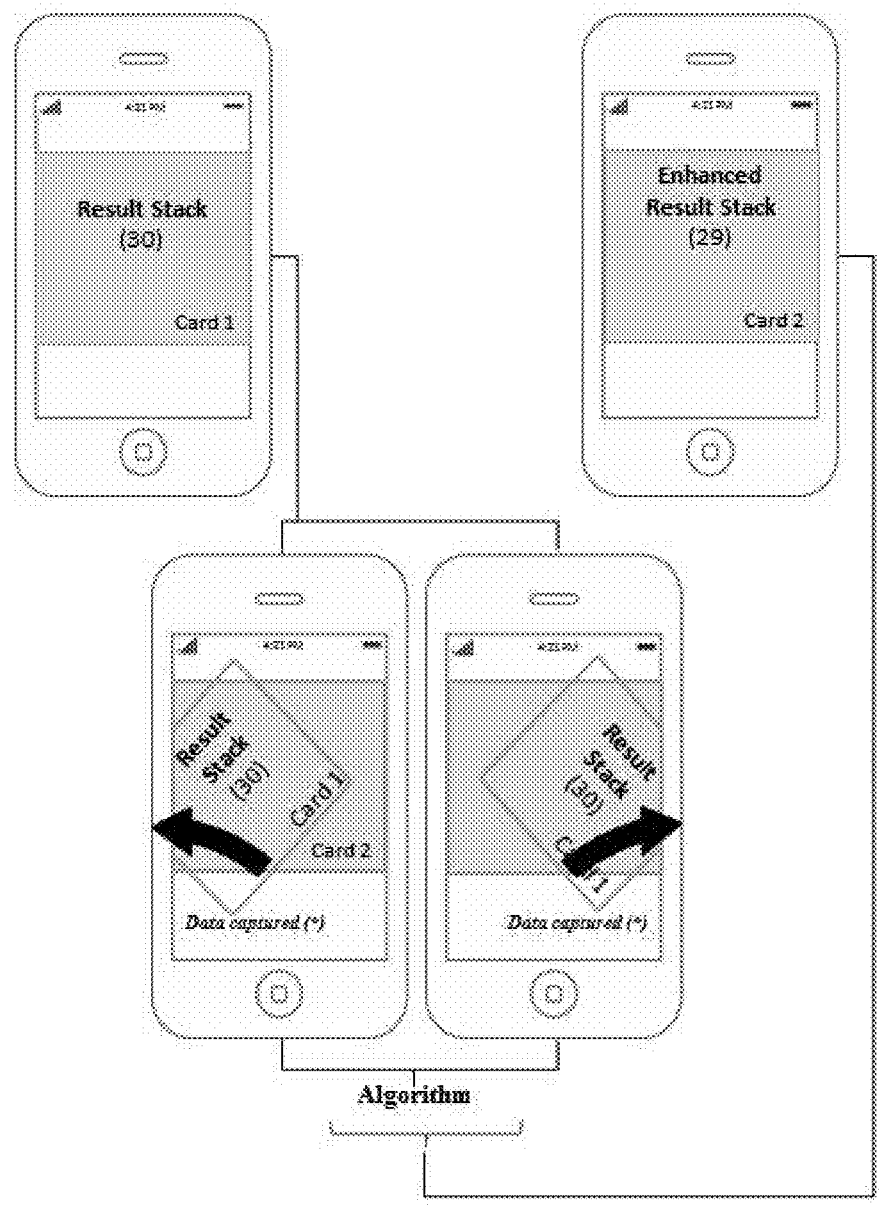

FIG. 1 is a flow chart which illustrates steps of a computerized method of collecting, sorting and presenting information and/or articles to a user, where the method is in accordance with an embodiment of the present invention. FIG. 2 is a diagram which illustrates a system or architecture which can be used to practice the method illustrated in FIG. 1. As shown, the method provides that information, such as a plurality of information articles, is collected, such as by one or more computers in a network, from one or more information sources. As shown in FIG. 2, the information may be collected from, for example, RSS feeds, application program interfaces (API's) from publishers, and data from social media (such as Twitter, Facebook, and/or Instagram, or other social media platform), as well as other or alternative sources. Attributes (such as location, popularity, source, etc.) are assigned to the data by one or more computers, and the one or more computers store the data and associated attributes in one or more databases. Also stored in one or more databases, either in the same database(s) or in other databases as the collected information, is information about users. An application is made available to users for use on a mobile device or tablet (see FIG. 4A and FIG. 4B, which illustrates the graphic user interface). Information articles are presented to the user via the application. User interaction with the application is tracked to determine user preferences with regard to the articles which are presented. This user interaction which has been tracked is thereafter used to determine what information to present to that user in the future via the application, and/or what information should be presented to other users, such as users in the same or similar location, or users in the same or similar demographic, etc., using the application. Because information is prioritized before it is sent to the users, the users have more incentive to use the application to obtain information (such as view news stories).

With regard to the tracking of user interaction, as shown in FIG. 4, the application may be configured such that a user swipes one way (such as right) to indicate interest in the information being displayed (such as a news story), and swipes another way (such as left) to indicate a lack of interest in the information being displayed (such as a news story). Note that the directions (up, left, right, down) of the swipes can be easily adapted based on the need of system designs; for example, an embodiment uses "up" to indicate like and "down" to indicate dislike.

In some embodiments, the systems, methods, media, devices, and platforms described herein track the user swipes to provide that information, such as articles, news stories, video clips, and/or audio files, and the like, which are fed to users in an efficient manner, in a manner based on time relevance, assumed interest with regard to that given user based on past actions by that user or information otherwise known about that user, as well as interest in the articles demonstrated by other users. Of course, the applications, methods, media, platforms, devices, and systems described herein can be configured such that some other action taken by the user is tracked instead of, or in addition to, swipes by the user. Regardless, user interaction regarding the application is tracked and used to effectively sort and prioritize the information in the database, such that user interaction with the application affects what information is delivered to that particular user, or even other users, in the future. Non-limiting examples of user interactions tracking include eyeballs tracking, face tracking, expression tracking, gestures tracking, and motion tracking. In an embodiment, any motion or movement taking place by a portion or the whole of the human body is used to track the reaction of the reader.

In some embodiments, the user reaction is not binary (i.e., like or dislike), but in a scale. For example, the user reaction ranges from 1 to 10 in certain applications. For example, the user can click a meter between 1 and 10 to indicate the degree of likeness. The range of the scale can be adapted on the need of embodiments. In some embodiments, a combination of binary and scaled (i.e., degree) of reactions is used.

The methods, devices, media, platforms, and systems described herein are effectively configured to passively collect user data to display the most relevant results of a query. Swiping (for example) through results on the interfaces of a computing device (e.g., desktop computers, mobile and tablet devices) represents a low impact action on users that allows for a high level of data collection that can be used to filter and improve future query results automatically. For example, for a query on news, results based on passively collected data combined with the most recent stories results in a news feed which a given user will more likely find interesting, rather than just feeding a user random news stories. For a general search query, rating results by swiping left or right passively collects data on user feedback on each result which improves the search algorithm for future queries. Swiping through results in different directions not only allows a user to quickly move through results using the application, but also allows the publisher to gather information on what results are bad and which are satisfactory by forcing users to swipe in one direction or the other. For example, swiping left would denote a poor experience, while swiping right would denote a positive experience. This passive, low impact data collection method is then preferably used in real time to sort future results in the graphic user interface (i.e., the mobile device or tablet running the application). Preferably, a constant feedback and results query loop is implemented to graphically order results that are more relevant or more satisfactory in general. The system provides that overtime (i.e., news stories which are too old), bad results notated by many users swiping left are weeded out of the results or at least seriously devalued. Other results that get many swipes to the right are valued higher in the results. Preferably, not only are results sorted per person (i.e., user) individually, but global feedback is taken into account. Preferably, the system provides that information articles/images/videos/audios (and the like) are graphed by initial personal data (i.e., information about the user, either actively supplied by the user or other discerned about the user (such as location, etc.), while using passive interaction data to continually reorder the articles in real-time, while new stories are being injected into the stream, all while other stories are increasing/decreasing in stature based on popularity and time decay. Preferably, by the time a single piece of information is shown to the user (i.e., via the application), the information has effectively competed against other information based on popularity, time relevance, what is known about the user based on, for example, initial signup interest data and how the user has responded to all the other articles with which the user has interacted (i.e., did the user swipe right or left?), as well as what their friends (such as Facebook friends) and other local data have indicated vis-a-vis the system. Preferably, the system uses technology to effectively touch on all the historical qualities of what makes a given piece of information relevant in order to separate the best and most relevant information from what other users may think is relevant. Preferably, the system effectively eliminates the guesswork of determining what not only an audience in interested in, but what a given user will find interesting, based on how that user and other users have interacted with the application as they were being shown the information. Preferably, the system constantly weighs, for example, the following attributes before determining which specific article should be presented to a given user via the application: what a user's friends are reading (i.e., what articles have they swiped right to), locale, time, personal interests (i.e., personal readership interaction history), popularity graph and trending status of article, time decay function, quality of content, integrity and bias of writer and publisher, etc.

In certain applications, the methods, devices, platforms, media, and systems described herein re-order pieces of information (e.g., articles, images, videos, audios, and the like) in real-time. For example, assuming a user is running the application and requests a piece of information, the system method, device, or platform may have all the information articles/images/videos/audios in order and prioritized from, say, number 1 to 10,000. Upon receiving a query from the user using the application, information number one is depicted on the display (of the mobile device, desktop, or tablet) using the application. Before the user even has a chance to view information number one, read the headline and decide if they are interested in reading the article or not, the global environment has changed in that other users have effectively indicated an interest or a lack of interest in given information which was presented to them, or within seconds a new piece of information may have been added to the numerous, for example 10,000, pieces of information and that new information may contain more contents than a past information (including for example in the 10,000 on the same subject).

For example, assume that Publisher A posts an article about an automobile accident and the article begins trending in the corresponding local area. By the time that article may have been shown to a user via the application, a new article could have been posted by Publisher B that reports not only that there was an accident, but that there were major injuries were involved. Perhaps minutes later Publisher C posts an article providing the same information, but also providing the names of the victims in the accident. In this example, a social network (such as Facebook or Twitter) may have given a larger weight to the story from Publisher A because the first story and report has a tendency to be shared the most, despite the fact that the story from Publisher A no longer contains the best information. On the other hand, assume the article from Publisher C is weighed in (i.e., assessed against the other articles). While it can be assumed that the article from Publisher C has the best information because it contains the names of the victims, perhaps history (i.e., tracked information regarding user interaction) indicates that users do not like Publisher C because their information has been inaccurate. In this case, the article from Publisher C would be weighed down by the system. Preferably, the system weighs quality and integrity of stories on the same topic against each other in order to determine the best information to present to users. This is important given the increasing amount of citizen journalism on social media, which results in inaccurate stories traveling quickly before or even while the correct information is being released or published. Furthermore, in this example, perhaps a given user has always clicked out of (i.e., swiped left after briefly viewing) an article about automobile accidents and tragedies because that given user has found such stories to be too negative or sad. The system preferably takes that into account. As such, the system may have determined that none of the stories about the automobile accident should be presented to that given user. On the other hand, despite the fact that a given user has indicated a lack of interest when it comes to stories about automobile accidents (i.e., by swiping left), the system may determine that an article about an accident should still be presented to the user because, for example, the user may be travelling through the area and the information may be relevant to the user's traffic route. In this case, the system would give the article priority with regard to that user, despite that user having indicated a lack of interest with regard to similar stories.

In some embodiments, one or more of the algorithms (e.g., re-ordering) are dynamic. It utilizes statistics, probabilistic modeling, machine learning, pattern recognition, and artificial intelligence analysis.

Figure 3:
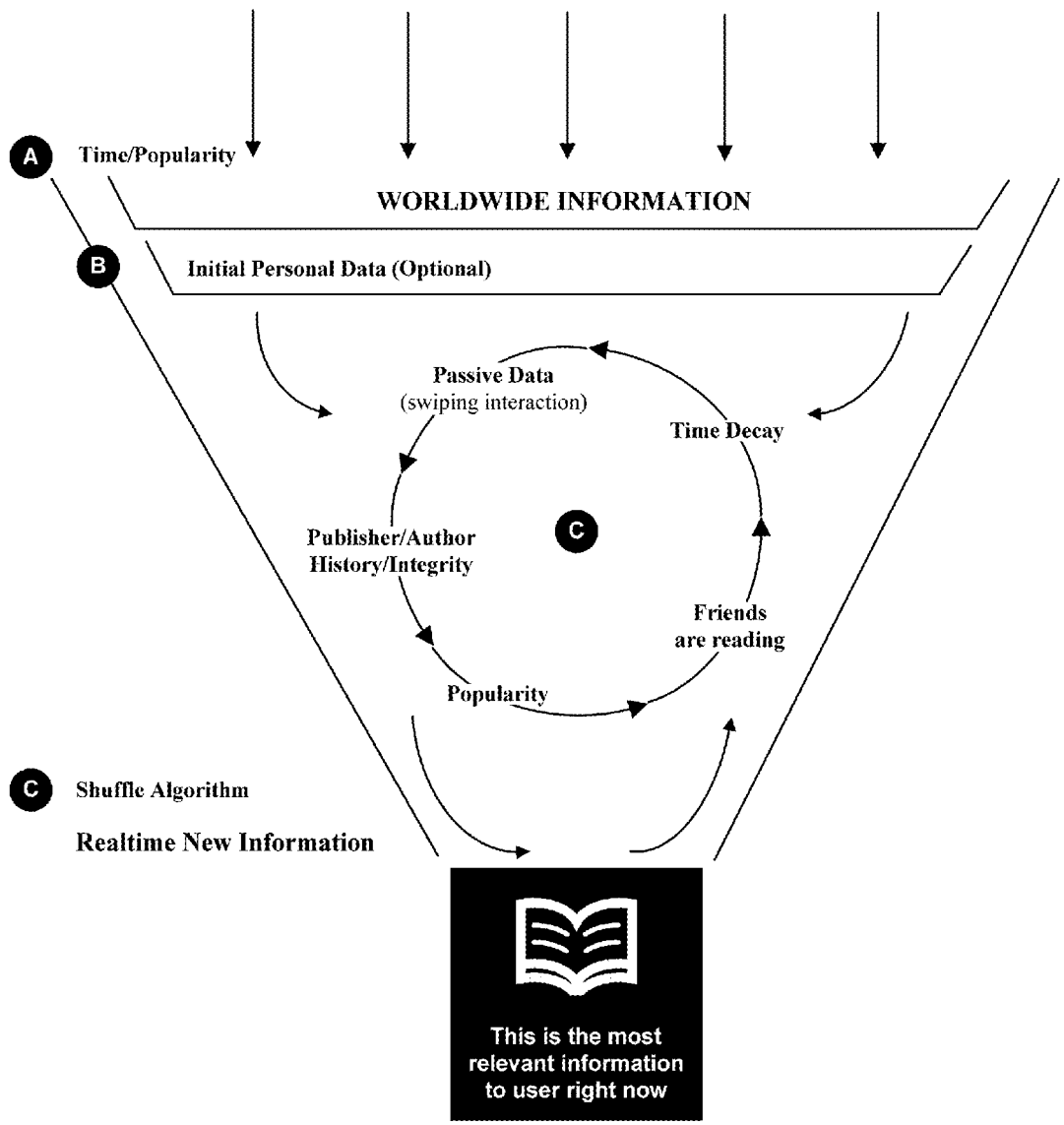
FIG. 3 is an illustration which shows how the method and system is used to effectively funnel information to a given user.

FIG. 3 is an illustration which shows how the methods, devices, media, platforms, and systems described herein are used to effectively funnel information to a given user, and is self-explanatory. The system, method, device, or platform collects all the information (in any types of formats) from the world. Features of information are analyzed first, e.g., location, time, and popularity. To filter the information best match with a user, the system utilizes the user's personal data to identify the best match. The personal data includes the demographic data, and the historical passive feedback provided by the user. In some embodiments, the personal data includes family information and friend information, which are provided in the personal profiles or from one or more social media. The analysis funnels the most preferred information.

As discussed, feedback in news is often cumbersome and requires extra user input. However, it can be extremely valuable given the sheer frequency and size of information being pointed at an individual nowadays through social networks and a myriad of platforms. A system which is in accordance with an embodiment of the present invention provides that information is presented and feedback is collected effectively simultaneously. In turn, this real time feedback is used to determine what information to present to users.

For example, as shown in FIG. 4, the systems, methods, media, devices, and platforms described herein may be configured such that if an article is presented to a user (via the application), and the user swipes left (thereby indicating to the system a lack of interest in the article), preferably the subject matter operates such that the article disappears for that particular user (via the application), and the system, method, device, or platform is configured such that articles with similar attributes are de-valued for that particular user. Additionally, preferably the system, method, device, or platform described herein provides that the more users that swipe left for a particular article, the more the article is devalued globally (i.e., with regard to other users). Additionally, preferably the system, method, device, or platform provides that the more times a specific publisher or author's article is swiped left, the system, method, device, or platform responds by effectively devaluing that specific publisher or author's articles. Preferably, this devaluing occurs in real time and effectively deter lines or affects the rankings of the articles.

On the other hand, if an article is presented to a user (via the application), and the user swipes right (thereby indicating to the system an interest in the article), preferably the system, method, device, or platform described herein operates such that the article is added to a reading list for that user, and articles with similar attributes are valued higher for that particular user. Additionally, preferably the system, method, device, or platform provides that the more users that swipe right for a particular article, the more the article is valued globally (i.e., with regard to other users). Additionally, preferably the system, method, device, or platform provides that the more times a specific publisher or author's article is swiped right, the system, method, device, or platform responds by effectively valuing higher that specific publisher or author's articles. Preferably, this increased valuing occurs in real time and effectively determines of affects the rankings of the articles.

Another embodiment of the present invention relates to content discovery searches. In a content discovery search, an individual seeking information based on a query is presented with results. The results are presented as a list of links. The results are not as relevant as they should be, given that conventional search programs do the following for the user: present a user with results based on some query or algorithm, the user clicks on a link to a third party web site, and the results are rated based on antiquated quantifications such as estimated time spent on the website and estimated bounce rate of the users (in reality, these two are merely estimated because search engines do not have any direct access to the result itself).

Figure 5A:
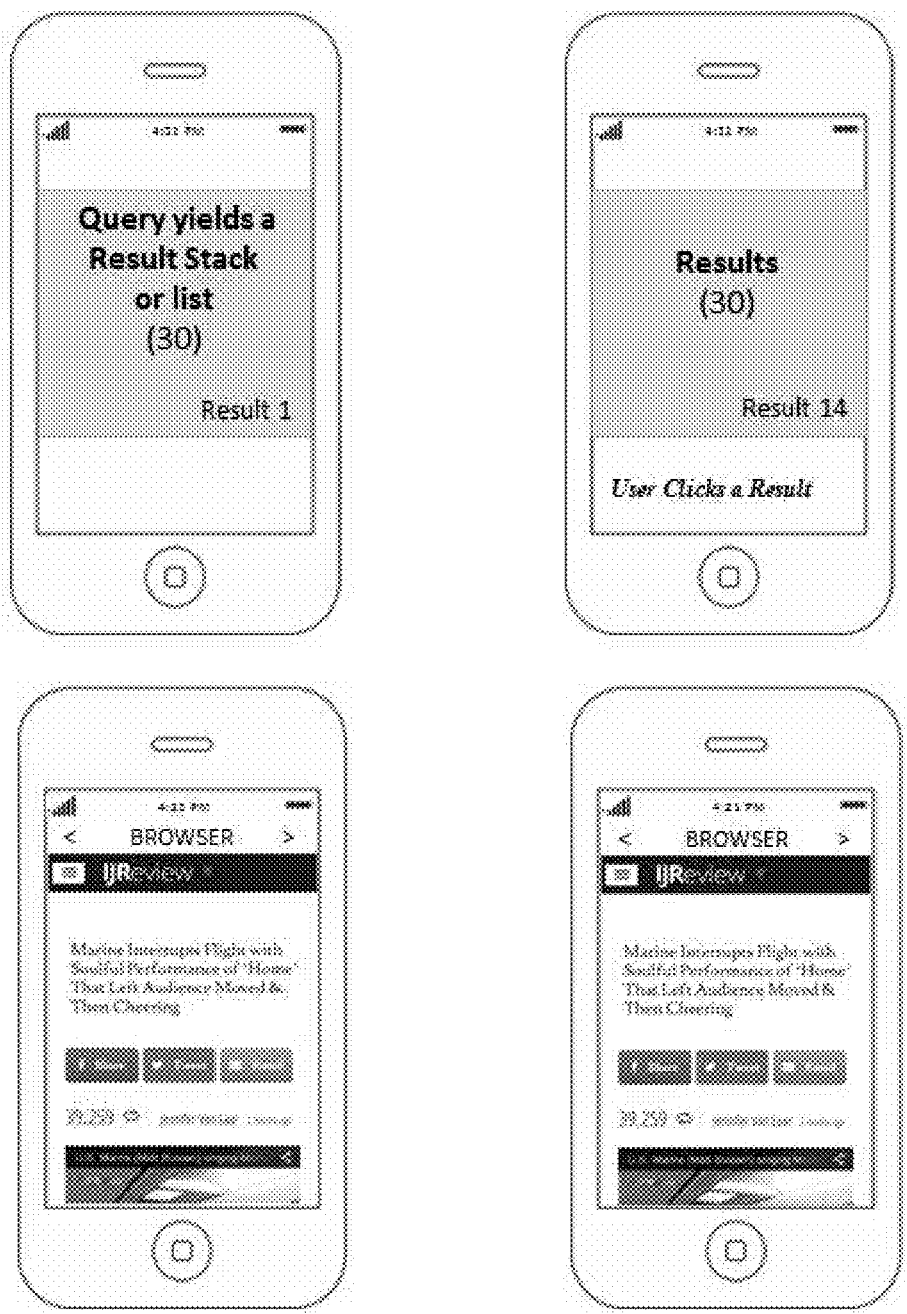
Figure 6:
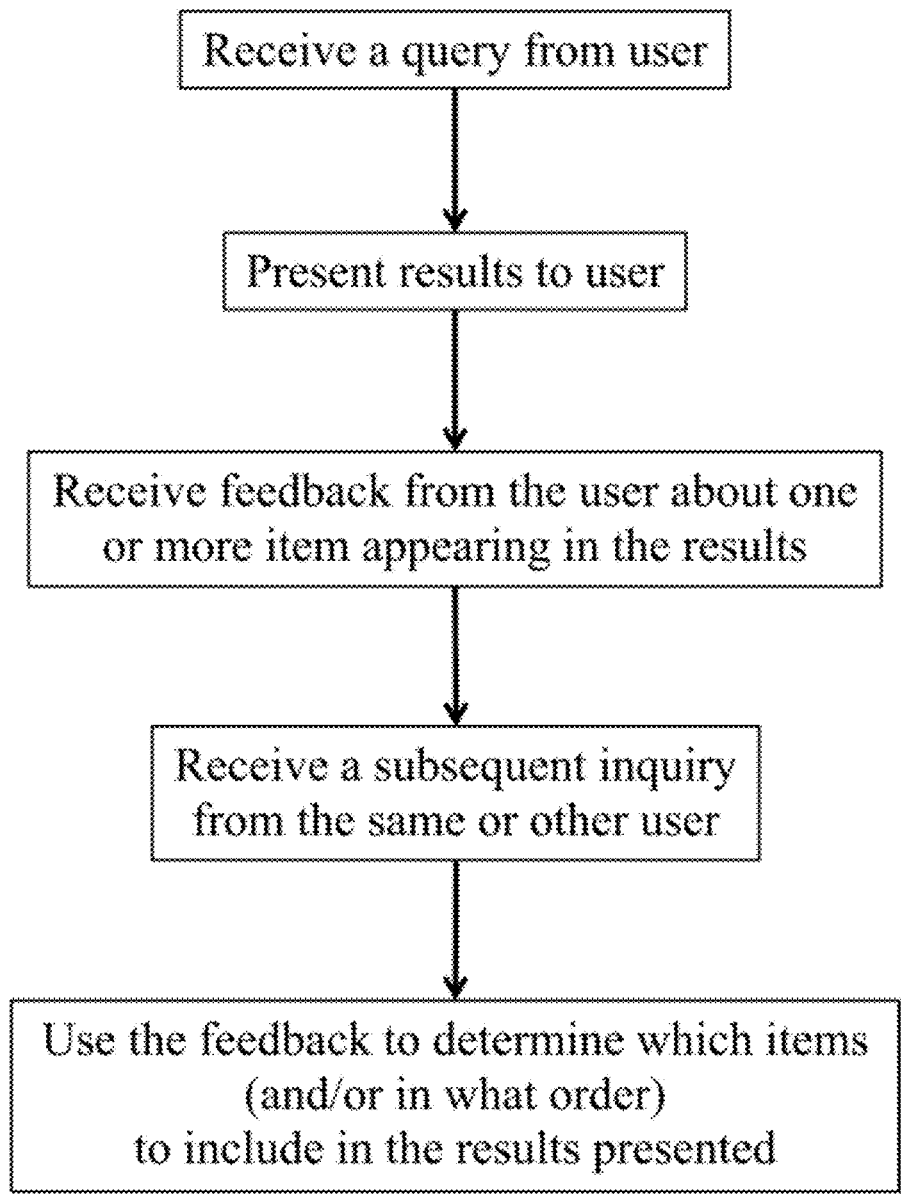
FIG. 6 is a flow chart which illustrates a computerized method of collecting, sorting and presenting information to a user, where the computerized method is in accordance with an alternative embodiment of the present invention and relates to content discovery searches.

In a computerized method, device, platform, and system described herein which is in accordance with an embodiment of the present invention, results of the query are displayed within a search user interface (such as on the screen of a mobile device or tablet running the application previously discussed), allowing the search engine itself to, in its most basis embodiment, have full analytics over the quality of the result. However, the more advanced provides that the user can effectively offer active feedback by one click, swipe or arrow movement, for example. As an example, as shown in FIG. 5A and FIG. 5B, a user queries news stories about the Supreme Court. Stories are shown in a list. The user clicks the first result, which is an article on CNN.com. The CNN.com article is displayed within a frame or in application browser. The user can then arrow left to indicate that the result was not worthy and move on to the next result, or arrow right to indicate that the result was worthy and move on to the next result. Regardless, active feedback is communicated back to the system which appends results globally and per user. Preferably, the system provides that information and external site links are sorted in search results and on feeds for users based on active feedback obtained by other users who have visited those external third party sites. As such, this embodiment is much like the first described, except that instead of presenting the user with articles, having the user indicate an interest in the article (by swiping right, for example) or a lack of interest in the article (by swiping left, for example), and adjusting the ranking of articles based on user feedback, this second embodiment (or add on to the first embodiment) allows the user to query, provides the user with a list of links or articles that match the query, has the user select an item in the list of results and indicate an interest in the selected item (by swiping right, for example) or a lack of interest in the item (by swiping left, for example), and adjusts the ranking of items based on user feedback, where the ranking at least helps determines what information is presented to users in the future. FIG. 6 illustrates the steps of this alternative method and is self-explanatory given the foregoing discussion. Generally, both embodiments described herein provide that users are presented with information. The users use a user interface to indicate an interest or lack of interest in the different items of information. The user indications are tracked and employed to determine what information is to be presented to that user and/or other users in the future.

In the description above, the example was given of having the user swipe right (vis-à-vis the user interface) to indicate an interest in information, and having the user swipe left (vis-à-vis the user interface) to indicate a lack of interest in information; however, alternative types of user feedback can be requested via the user interface. Regardless, preferably the feedback which is received by the computerized system, method, device, or platform is used to determine which items to present (and in what order to present the items) to one or more users in the future.

While specific embodiments of the invention have been shown and described, it is envisioned that those skilled in the art may devise various modifications without departing from the spirit and scope of the present invention.

Data Analysis

In some embodiments, the analyses of collected information and personal data are based on statistics, machine learning, and/or artificial intelligence. FIG. 13 presents a classifier for information sorting. The system, method, device, or platform collects information from the world, and converts the information into machine readable formats. The formats are further verified. In addition, the system, method, device, or platform processes the information contents to extract one or more keywords. For text information, the system, method, device, or platform is able to analyze the context and extract crucial keywords. For non-text information, the system, method, device, or platform is able to process images, videos, audio to utilize machine learning techniques to understand the contents, followed by keywords extractions. In certain embodiments, the analysis includes removing variations of contents (e.g., words, images, voices, sounds) and reduces the contents to simplest form. Furthermore, the redundant information/contents (e.g., stop words, or transitioning images/sounds/voices) are removed. In further embodiments, the contents are classified; for instance, one or more statistical algorithms are used to search contents to recommend the defined categories/topics of the information. Then, the system, method, device, or platform chooses top recommendations for categories/topics, which are assigned to the information articles/images/videos/audios. Finally, additional information data is then processed and added to the data model.

Figure 14:
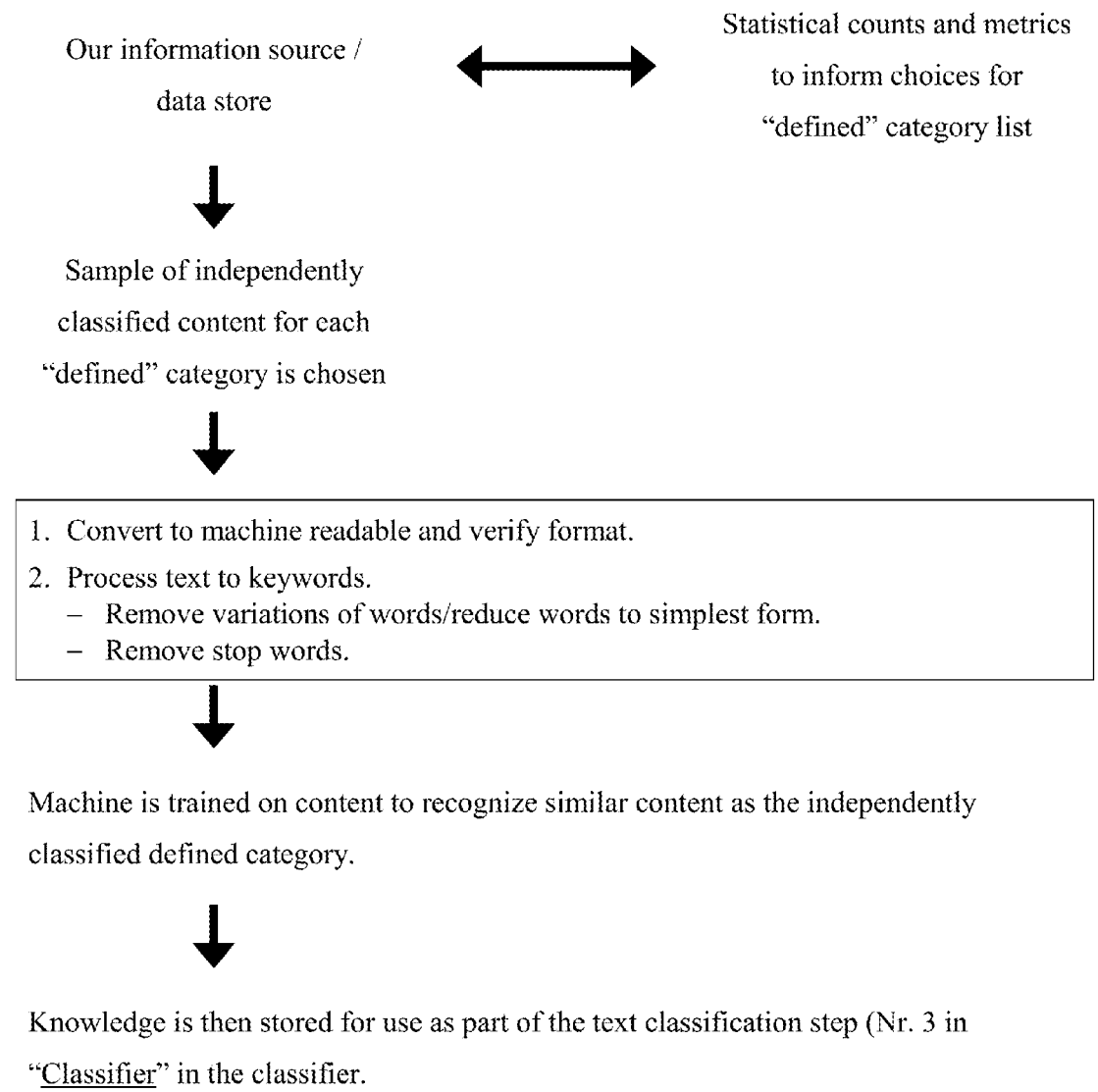
FIG. 14 illustrates an example of statistical data analysis based on human knowledge and automatic classifier.

Another embodiment is presented in FIG. 14, where the human knowledge and machine learning are integrated for information sorting. The system, method, device, or system collects all types of information from the world and stores the information in a local storage. The statistical counts and metrics are used to inform choices for defined category list. Then, samples of independently classified content for each defined category are chosen. In a further embodiment, the system, method, device, or platform converts the collected information into machine readable formats and verifies the formats. For example, the system, method, device, and/or platform described herein processes the information contents to extract one or more keywords. For text information, the system, method, device, and platform is able to analyze the context and extract crucial keywords. For non-text information, the system, method, device, or platform processes images, videos, audio, or other data files to utilize machine learning techniques to understand the contents, followed by keywords extractions. In certain embodiments, the analysis includes removing variations of contents (e.g., words, images, voices, sounds) and reduces the contents to simplest form. Furthermore, the redundant information/contents (e.g., stop words, or transitioning images/sounds/voices) are removed. Additionally, the technology described herein trains a recognition module to recognize similar contents as the independently classified category. The knowledge is then stored for use as part of the content (text, images, videos, audios) classification step.

Digital Processing Device

In some embodiments, the platforms, media, methods, systems, software applications, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, wearable devices (including technologies such as Google Glass, smartwatches such as the Apple iWatch, Android Wear (which includes smartwatches and other wearable technologies), and Cufflinc wearable devices), and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia®Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the platforms, systems, software applications, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, software applications, media, and methods disclosed herein include software, server, and/or database modules, or use of the same. In view of the disclosure provided herein, software modules are created by techniques known to those of skill in the art using known machines, software, and languages. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, software applications, media, and methods disclosed herein include one or more databases, or use of the same. In view of the disclosure provided herein, those of skill in the art will recognize that many databases are suitable for storage and retrieval of network event data. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, devices, media, and methods described herein and are not limiting in any way. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Example 1

Graphic User Interface

FIG. 7A and FIG. 7B illustrates an example of the graphic user in an embodiment. Referring to FIG. 7($a$), component 701 comprised a function of search. The user could use this to search publishers, people, or any particularities. Component 702 was the place to display sorted information; in this example, the system was performing sorting, so an image of "shuffling" was displayed. Components 703 and 704 were buttons for the user to provide feedback, where 703 indicated a dislike and 704 indicated a like. Components 705, 706, 707, and 708 were particular categories (interests, popular, nearby, and following, respectively) to narrow the search.

Component 709 allowed a display of the user's picture. Component 710 recorded the amount of liked information the user had indicated. Component 711 was a button where the user could clickto share the current information with friends via social media (Facebook, Twitter, email).

During the shuffling, the system utilized a learning algorithm to explore the best match between information and the user's interest. The exploration was based on machine learning algorithms. The device that was installed with the learning technology described herein became a special purpose computing device dedicated to information learning device. First, the contents of information were analyzed to identify representative features. The features were modeled as random variables. A classifier based on probabilistic modeling was used classify the category (or categories) the information should belong to. On the other hand, the user data (e.g., demographics, locations, interests, etc) was also modeled probabilistically. The match between the content features and the user was based on various machine learning algorithms. The user's feedback was treated as prior human knowledge, which was used to predict the most relevant categories to the user. The prediction was based on statistical analyses, such as Bayesian statistics and regression analysis. The information within the categories was further distilled by the statistical analyses to identify the best information articles/images/videos/audios for the user.

Referring to FIG. 7B, once a sorting was completed, the display region 712 presented a snapshot of an information to the user. The user could click on the display region to access the detailed information. Later on, the user could provide a feedback to indicate like or dislike.

Example 2

Information Video

Figures 8A, 8B:
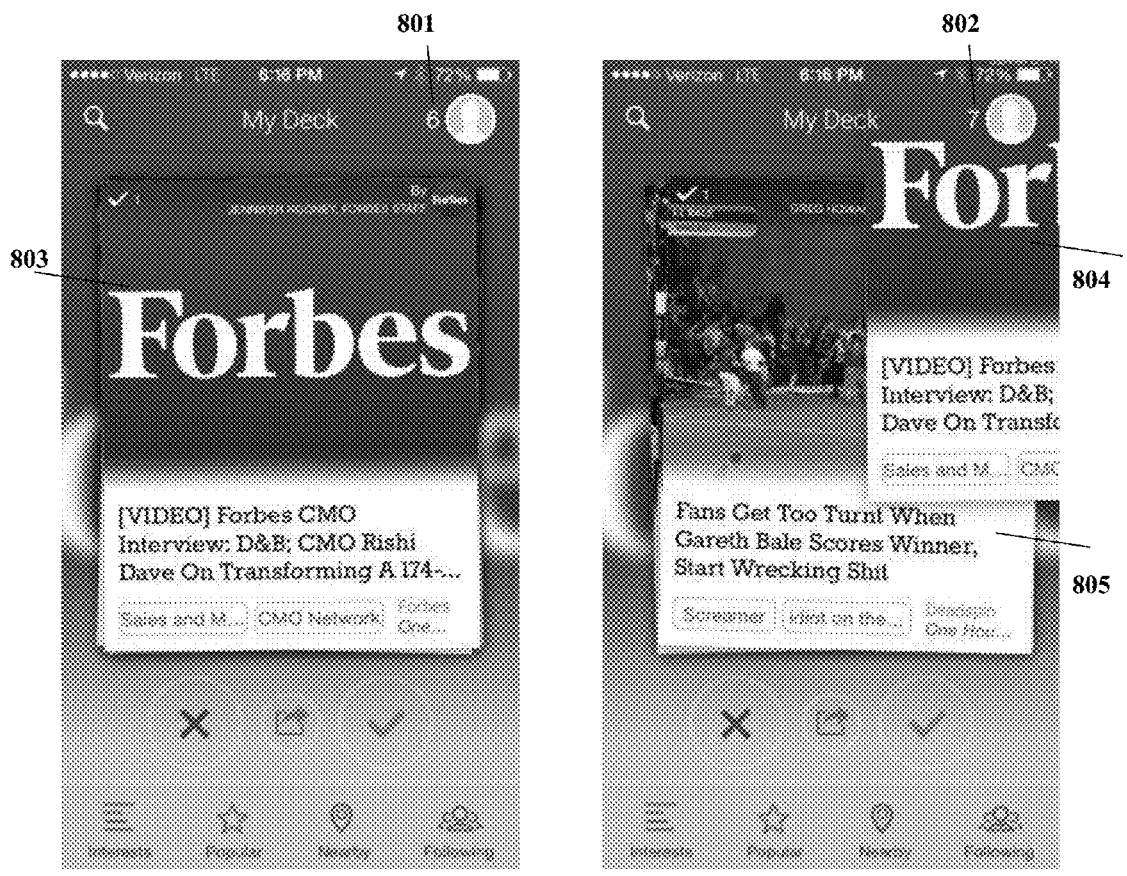
FIG. 8A and FIG. 8B illustrate an example of an embodiment where the user liked the information video; in this case, an interview video with Forbes CMO was presented to the user in FIG. 8A, and the user flicked or swiped the information message to the right, shown in FIG. 8B, as an indication of liking the information video.

FIG. 8A and FIG. 8B illustrates an example of an embodiment where the user liked an information video. The system analyzed the profile information of the user and identified information which was of the user's interest with high probability. In this example, an interview video with Forbes CMO was presented to the user, shown as 803 in FIG. 8A. When the user would like to move on to the next information message, the system required the user to provide a binary indication which either liked or disliked the information. The user could click the "check" or "cross" button in order to express "like" or "dislike," respectively. Alternatively, the user could swipe the information to the right or to the left, in order to express "like" or "dislike," respectively. In FIG. 8B, the user swiped the information 804 to the right, corresponding to an indication of liking the information. Referring FIG. 8B, when the user was wiping the information video, the next information message 805 which was a news titled "Fans Get Too Turnt When Gareth Bale Scores Winner, Start Wrecking Shit" was popping up.

Once the user liked the information 804, the number of liked information changed from 6 (shown in component 801) to 7 (shown in component 802).

Example 3

Information Article

Figure 9A:
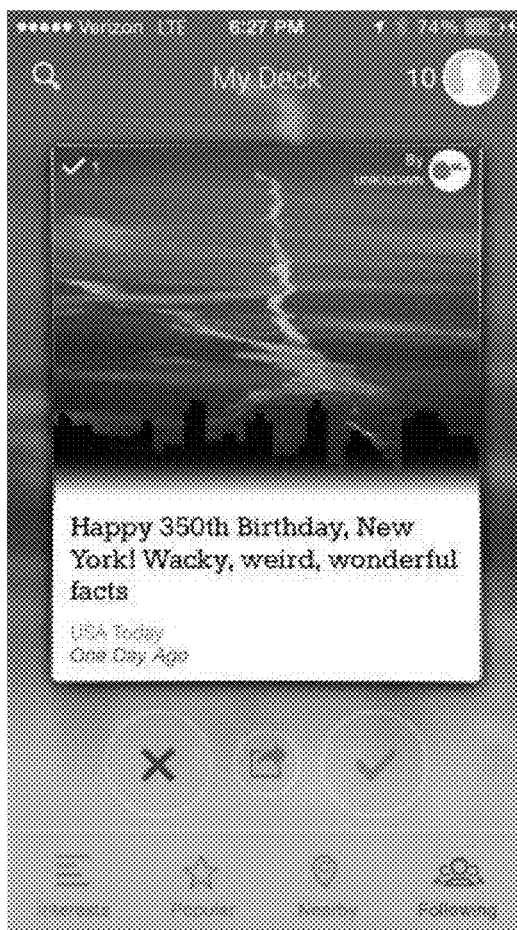
FIG. 9A and FIG. 9B illustrate an example of an embodiment where the user disliked the information news; in this case, an article "Happy 350$^{th}$ Birthday, New York!" by USA Today which was presented to the user in FIG. 9A, and the user flicked or swiped the information message to the left, shown in FIG. 9B, as an indication of disliking the information message.
Figure 9B:
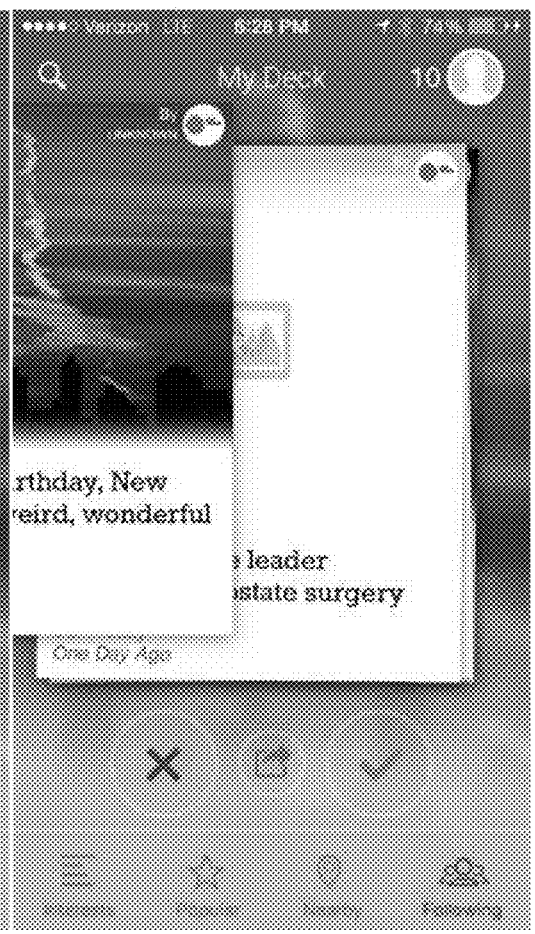

FIG. 9A and FIG. 9B illustrates an example of an embodiment where the user disliked an information article. The system analyzed the profile information and the past like/dislike history of the user to sort an information message of interest. In this example, an article "Happy 350$^{th}$ Birthday, New York!" published by USA Today with was presented to the user, shown in FIG. 9A. When the user would like to move on to the next information message, the system required the user to provide a binary indication which either liked or disliked the information. In this example shown in FIG. 9B, the user wiped the information to the left, an indication of disliking the information article. Furthermore, referring FIG. 9B, when the user was wiping the information article, the system was searching the best information match with the user's interests.

Example 4

Narrow Information Sorting Using Categories

Figure 10A:
FIG. 10A, FIG. 10B, and FIG. 10C illustrate an example embodiment using one or more categories to narrow the information sorting; in this case, the "interest" category was enabled to sort the information of a user's interest.
Figure 10B:
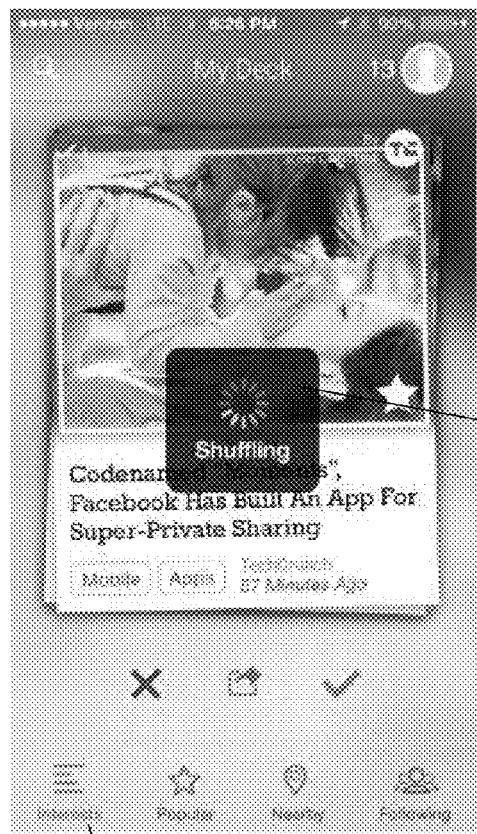
Figure 10C:
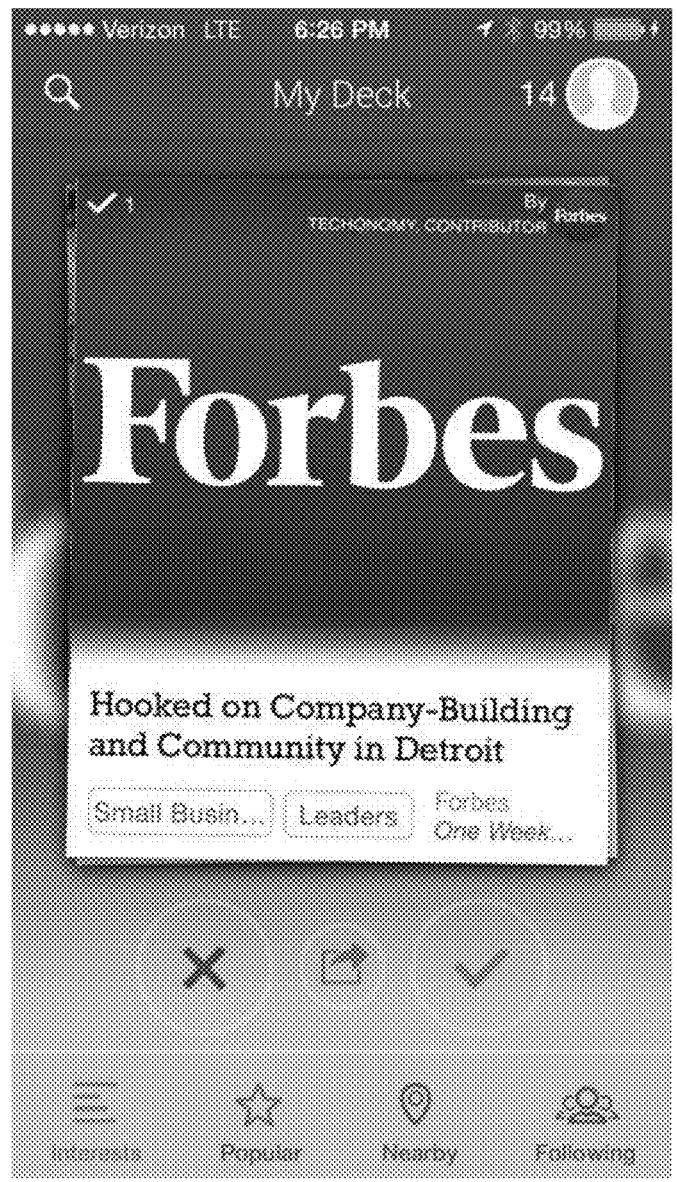

FIGS. 10A-C illustrate an example of an embodiment using category "interest" to further sort the information. As illustrated in FIG. 7, there were various categories (components 705 to 708) which can enhance the sorting accuracy. Referring to FIG. 10A, the category "interests" (1001) was not enabled. After the user clicked the icon, the icon became highlighted as 1002 in FIG. 10B, and then the system generated a shuffling icon 1003 to indicate the system was undergoing sorting. Once the sorting completed, see FIG. 10C, the system presented the best information; in this case, an article from Forbes was identified.

The categories were modeled probabilistically. A category was treated as a random variable. A classifier based on learning algorithms was used to classify information contents into categories. When the user narrowed the information sorting within certain categories, the device described herein further analyzed statistically the information contents within the categories of the user's interest. Furthermore, the learning algorithms mapped the information features to the user's data, or vice versa, to find the information aligning best with the user.

Example 5

Search Publishers

Figure 11C:
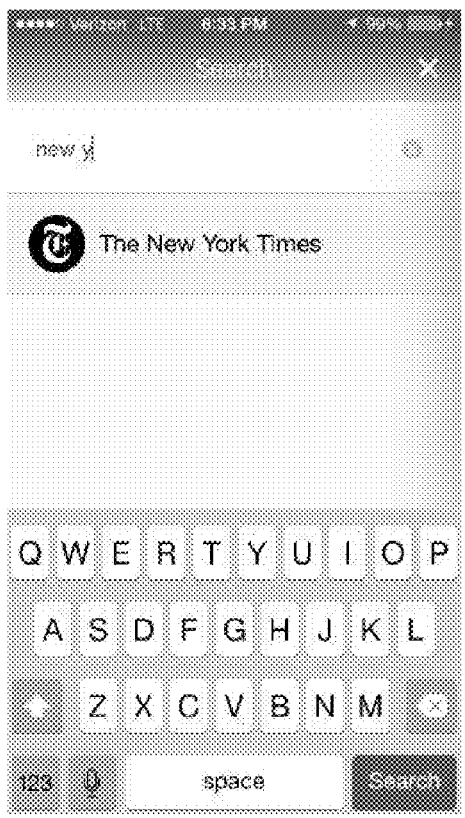
Figure 11D:
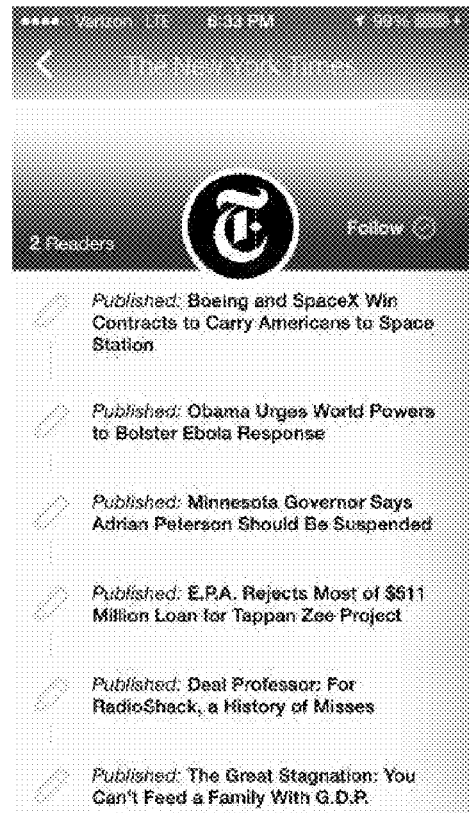
Figure 11E:

FIG. 11 illustrates an example of an embodiment using the search function to find publishers of interest. Referring to FIG. 11A, component 1101 allowed the user to enable the search function, which changed the user interface, shown in FIG. 11B. In FIG. 11B, a text box 1102 was displayed to enable the user to type the keywords of the search. In FIG. 11C, the user attempted to find New York Times; he typed "new y" and the system immediately identified The New York Times 1104 as a most likely candidate. The user then clicked the icon of The New York Times, moving to another screen shown in FIG. 11D, where a list of articles relevant to the user's interest was presented. When the user click one item, the full access to the article "For RadioShack, a History of Misses" was displayed, as shown in FIG. 11E.

Example 6

Share Information

FIG. 12A and FIG. 12B illustrates an example of an embodiment using the share function to share the information on social media. Referring to FIG. 12A, the system presented an article "Under Armour missed out on Kevin Durant, but signed Gisele" to the user. The user loved this article and he was eager to share this article with his friends. When clicking the button 1201, the system moved to another screen FIG. 12B where the user could choose which social media (Facebook, Twitter, email) and/or which friends to share the article.

What is claimed is:

1. Non-transitory computer-readable storage media encoded with a computer program including instructions executable by a processor to create an application comprising:
   (a) a software module configured to receive information from an information source on the Internet;
   (b) a software module configured to assign one or more attributes to the information;
   (c) a software module configured to receive user data from a user, wherein the user data is modeled probabilistically and comprises one or more of: demographic information of the user, an interest of the user, and past preferable information of the user;
   (d) a software module configured to sort the information and identify preferable information from the information sorting, wherein the identifying the preferable information from the information sorting is based on a weight on the information source;
   (e) a software module configured to present the preferable information to the user;
   (f) a software module configured to receive passive feedback and active feedback from the user regarding the preferable information presented to the user, and update the user data with the passive and active feedback;
   (g) a software module configured to increase or decrease the weight on the information source based on the user's passive feedback and active feedback;
   (h) a software module configured to generate global feedback from the passive and the active feedback from all users; and
   (i) a software module configured to implement a feedback and results query loop, and reorder the preferable information presented to the user with the receipt of the passive feedback, the active feedback, the global feedback, and an increased or decreased weight on the information source.

2. The media of claim 1, provided that the information comprises one or more of the following: an article, a message, a text, a video file, an audio file, a table, a database, and an RSS feed.

3. The media of claim 1, provided that the information source comprises one or more of the following: a website, a publisher, an author, a social medium, a news provider, a freelancer, a writer, an individual, a corporate entity, and a government agency.

4. The media of claim 1, provided that the one or more attributes comprise: a location, popularity, a target audience, an author, a country, and a category of an information content.

5. The media of claim 1, provided that the passive feedback comprises one or more of the following actions: moving a mobile device, clicking a button, wiping the preferable information, flicking the preferable information, sliding the preferable information, swiping the preferable information, a length of time the user accessing the preferable information, a location the user accessing the preferable information, and a device on which the user accessing the preferable information.

6. The media of claim 1, provided that the sorting the information comprises one or more of the following: analyzing demographic information of the user, comparing the data of the user with data of another user, analyzing the passive feedback from the user, analyzing a time when the information is generated at the information source, analyzing the information source, analyzing popularity of the information in the general public, and analyzing popularity of the information among the user's friends.

7. The media of claim 1, provided that the weight on the information source comprises one or more of the following: quality of a content, integrity and bias of a writer, a publisher, and one or more other information sources.

8. A computer-implemented system, the system comprising:
  (a) a digital signal processor;
  (b) memory and an operating system configured to execute computer instructions to create an application, the application comprising:
    (1) a software module configured to receive information from an information source on the Internet;
    (2) a software module configured to assign one or more attributes to the information;
    (3) a software module configured to receive user data from a user, wherein the user data is modeled probabilistically and comprises one or more of: demographic information of the user, an interest of the user, and past preferable information of the user;
    (4) a software module configured to sort the information and identify preferable information from the information sorting, wherein the identifying the preferable information from the information sorting is based on a weight on the information source;
    (5) a software module configured to present the preferable information to the user;
    (6) a software module configured to receive passive feedback and active feedback from the user regarding the preferable information presented to the user, and update the user data with the passive and active feedback;
    (7) a software module configured to increase or decrease the weight on the information source based on the user's passive feedback and active feedback;
    (8) a software module configured to generate global feedback from the passive and the active feedback from all users; and
    (9) a software module configured to implement a feedback and results query loop, and reorder the preferable information presented to the user with the receipt of the passive feedback, the active feedback, the global feedback, and an increased or decreased weight on the information source.

9. The system of claim 8, provided that the information comprises one or more of the following: an article, a message, a text, a video file, an audio file, a table, a database, and an RSS feed.

10. The system of claim 8, provided that the information source comprises one or more of the following: a website, a publisher, an author, a social medium, a news provider, a freelancer, a writer, an individual, a corporate entity, and a government agency.

11. The system of claim 8, provided that the one or more attributes comprise one or more of the following: a location, popularity, a target audience, an author, a country, and a category of an information content.

12. The system of claim 8, provided that the passive feedback comprises one or more of the following actions: moving a mobile device, clicking a button, wiping the preferable information, flicking the preferable information, sliding the preferable information, swiping the preferable information, a length of time the user accessing the preferable information, a location the user accessing the preferable information, and a device on which the user accessing the preferable information.

13. The system of claim 8, provided that the sorting the information comprises one or more of the following: analyzing demographic information of the user, comparing the data of the user with data of another user, analyzing the passive feedback from the user, analyzing a time when the information is generated at the information source, analyzing the information source, analyzing popularity of the information in the general public, and analyzing popularity of the information among the user's friends.

14. The system of claim 8, provided that the weight on the information source comprises one or more of the following: quality of a content, integrity and bias of a writer, a publisher, and one or more other information sources.

15. A method implemented by a computing device, the method comprising:
  (a) receiving, by the computing device, information from an information source on the Internet;
  (b) assigning, by the computing device, one or more attributes to the information;
  (c) receiving, by the computing device, user data from a user, wherein the user data is modeled probabilistically and comprises one or more of: demographic information of the user, an interest of the user, and past preferable information of the user;
  (d) sorting, by the computing device, the information and identify preferable information from the information sorting, wherein the identifying the preferable information from the information sorting is based on a weight on the information source;
  (e) presenting, by the computing device, the preferable information to the user;
  (f) receiving, by the computing device, passive feedback and active feedback from the user regarding the preferable information presented to the user, and update the user data with the passive and active feedback;
  (g) increasing or decreasing, by the computing device, the weight on the information source based on the user's passive feedback and active feedback;
  (h) generating, by the computing device, global feedback from the passive and the active feedback from all users; and (i) implementing, by the computing device, a feedback and results query loop, and reorder the preferable information presented to the user with the receipt of the passive feedback, the active feedback, the global feedback, and an increased or decreased weight on the information source.

16. The method of claim 15, provided that the information comprises one or more of the following: an article, a message, a text, a video file, an audio file, a table, a database, and an RSS feed.

17. The method of claim 15, provided that the information source comprises one or more of the following: a website, a publisher, an author, a social medium, a news provider, a freelancer, or a writer, an individual, a corporate entity, and a government agency.

18. The method of claim 15, provided that the one or more attributes comprise: a location, popularity, a target audience, an author, a country, and a category of an information content.

19. The method of claim 15, provided that the passive feedback comprises one or more of the following actions: moving a mobile device, clicking a button, wiping the preferable information, flicking the preferable information, sliding the preferable information, swiping the preferable information, a length of time the user accessing the preferable information, a location the user accessing the preferable information, and a device on which the user accessing the preferable information.

20. The method of claim 15, provided that (1) the sorting the information comprises one or more of the following: analyzing demographic information of the user, comparing the data of the user with data of another user, analyzing the passive feedback from the user, analyzing a time when the information is generated at the information source, analyzing the information source, analyzing popularity of the information in the general public, and analyzing popularity of the information among the user's friends; or (2) the weight on the information source comprises one or more of the following: quality of a content, integrity and bias of a writer, a publisher, and one or more other information sources.

* * * * *